United States Patent
Schwier

(10) Patent No.: US 6,402,026 B1
(45) Date of Patent: Jun. 11, 2002

(54) SMART CARD AND METHOD FOR BIDIRECTIONAL DATA TRANSFER BETWEEN A TERMINAL AND A SMART CARD

(75) Inventor: Andreas Schwier, Minden (DE)

(73) Assignee: ORGA Kartensysteme GmbH, Paderborn (DE)

(*) Notice: Subject to any disclaimer, the term of this patent is extended or adjusted under 35 U.S.C. 154(b) by 0 days.

(21) Appl. No.: 09/458,672

(22) Filed: Dec. 10, 1999

(30) Foreign Application Priority Data

Dec. 19, 1998 (DE) .......................... 198 58 840

(51) Int. Cl.$^7$ ............................................. G06F 17/60
(52) U.S. Cl. .................... 235/379; 235/379; 235/380; 235/382; 235/492; 705/64; 705/66; 705/75
(58) Field of Search ................. 235/379, 380, 235/382, 492; 705/64, 66, 75

(56) References Cited

U.S. PATENT DOCUMENTS

| | | | | |
|---|---|---|---|---|
| 4,393,500 A | * | 7/1983 | Imazeki et al. ................ 371/13 |
| 4,442,501 A | * | 4/1984 | Eckert, Jr. et al. .......... 364/900 |
| 4,447,887 A | * | 5/1984 | Imazeki et al. ............. 364/900 |
| 4,564,922 A | * | 1/1986 | Muller ......................... 364/900 |
| 4,877,945 A | * | 10/1989 | Fujisaki ........................ 235/379 |
| 5,532,463 A | * | 7/1996 | Debelleix et al. ........... 235/380 |
| 5,778,067 A | * | 7/1998 | Jones et al. ............. 235/379 X |
| 5,796,831 A | * | 8/1998 | Paradinas et al. ....... 235/379 X |
| 5,869,823 A | * | 2/1999 | Bublitz et al. .............. 235/380 |
| 5,889,266 A | * | 3/1999 | Schrenk ....................... 235/380 |
| 6,047,888 A | * | 4/2000 | Dethloff ....................... 235/380 |
| 6,220,510 B1 | * | 4/2001 | Everett et al. .............. 235/380 |

FOREIGN PATENT DOCUMENTS

| | | |
|---|---|---|
| DE | 695 00 751 | 5/1996 |
| DE | 196 00 081 | 7/1997 |
| DE | 196 05 361 | 8/1997 |
| DE | 196 15 303 | 10/1997 |
| DE | 44 39 266 | 4/1998 |
| FR | 0630027 A1 * | 5/1994 |

* cited by examiner

*Primary Examiner*—Karl D. Frech
*Assistant Examiner*—Daniel Walsh
(74) *Attorney, Agent, or Firm*—Foley & Lardner

(57) ABSTRACT

A method for bidirectional data transfer between a terminal and a smart card with a purse function comprises writing a transfer value from the terminal to a balance-of-account memory of the smart card, writing a write-in control value (E) to a control memory of the smart card together with the writing of the transfer value to the balance-of-account memory, and erasing the write-in control value (E) as soon as the transfer value is completely stored in the balance-of-account memory. In addition, a smart card for bidirectional data transfer between a terminal and a smart card with a purse function comprises at least one balance-of-account memory for storing a transfer value transmitted by the terminal and a control memory. The balance-of-account memory is assigned to the control memory for storing a write-in control value (E), which is alterable depending on the presence of a fault. The transfer value stored in the balance-of-account memory is finally stored only if the control memory has assumed a writing confirmation state.

12 Claims, 1 Drawing Sheet

SMART CARD AND METHOD FOR BIDIRECTIONAL DATA TRANSFER BETWEEN A TERMINAL AND A SMART CARD

BACKGROUND OF THE INVENTION

1. Field of the Invention

The invention relates to a method for bidirectional data transfer between a terminal and a smart card with a purse function. The invention also relates to a smart card capable of facilitating a bidirectional data transfer between a terminal and the smart card.

2. Description of the Related Art

DE 196 05 361 A1discloses a method for bidirectional data transfer between a terminal and a smart card in which amounts of money are written as transfer values to a balance-of-account memory of the smart card and stored therein. If a fault occurs during such a transaction, for example due to a power failure or due to the smart card being withdrawn from the terminal, the undesirable situation may be realized wherein the transfer value is only stored incompletely or after having been altered. Consequently, an incorrect transaction value would be stored, so that an incorrect balance of account would be assumed.

SUMMARY OF THE INVENTION

According to one embodiment of the invention, a method for bidirectional data transfer between a terminal and a smart card with a purse function is provided. A transfer value is written from the terminal to a balance-of-account memory of the smart card. A write-in control value (E) is written to a control memory at the latest together with the writing of the transfer value to the balance-of-account memory. The write-in control value (E) is erased as soon as the transfer value is completely stored in the balance-of-account memory.

According to another embodiment of the present invention, a smart card for bidirectional data transfer between a terminal and a smart card with a purse function, comprises at least one balance-of-account memory for storing a transfer value transmitted by the terminal, wherein the balance-of-account memory is assigned a control memory for storing a write-in control value (E), which can be altered in dependence on the presence of a fault, with the result that the transfer value stored in the balance-of-account memory is finally stored only if the control memory has assumed a writing confirmation state.

Further features of the invention form the subject matter of the claims and will be explained in more detail, in conjunction with further advantages of the invention, with reference to exemplary embodiments.

BRIEF DESCRIPTION OF THE DRAWINGS

Exemplary embodiments of the invention are illustrated in the drawings, in which.

DETAILED DESCRIPTION OF THE PREFERRED EMBODIMENT

The present invention relates to a method for bidirectional data transfer between a terminal and a smart card such that an incomplete write access to a balance-of-account memory of the smart card can be reliably identified and, if appropriate, given the presence of a fault, the content of the balance-of-account memory can be reset to the original state. The present invention also relates to a smart card that facilitates such a bidirectional data transfer.

Figure 1:
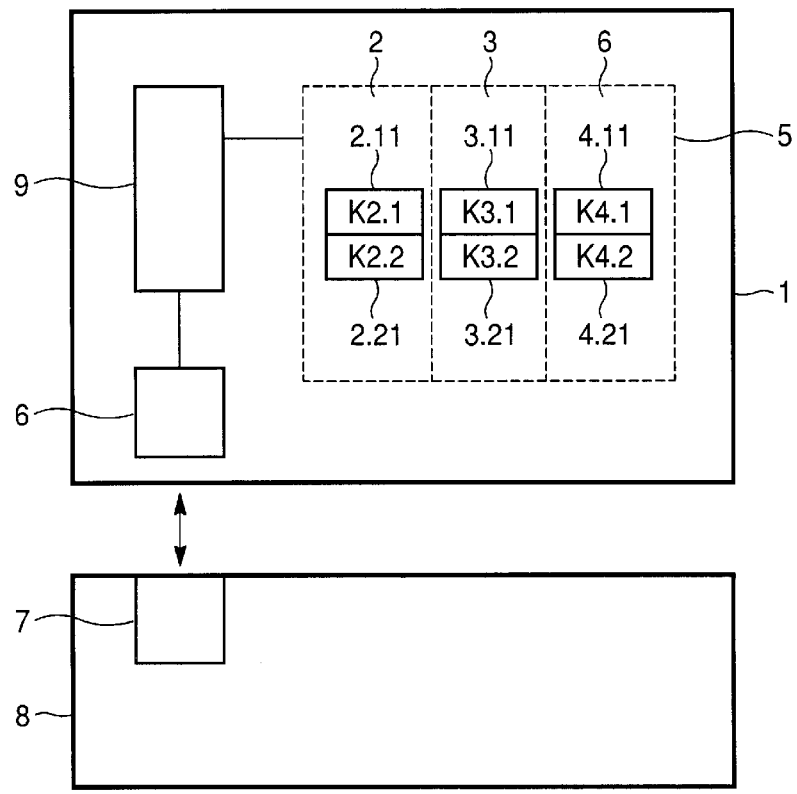
FIG. 1 shows a block diagram of a smart card according to an embodiment of the present invention in communication with a terminal.

A smart card 1 is shown in FIG. 1. Smart card 1 has a purse function with a total of three purses 2, 3, 4. Each purse 2, 3, 4 is assigned to a separate memory area of an EEPROM memory 5 of the smart card 1. The memory content of the purses 2, 3, 4 can be addressed or altered in a customary manner by means of a microprocessor 9 of the smart card.

The microprocessor 9 can be connected via an I/O interface 6 to an I/O interface 7 of a terminal 8, with the result that a communication or a data transfer between the smart card 1 and the terminal 8 can take place for a payment operation.

To store the amounts of money in the purses 2, 3, 4, it suffices for the purses 2, 3, 4 each to be assigned two balance-of-account memories 2.11, 2.21 and respectively 3.11, 3.21 and 4.11, 4.21 as purse memories. By way of example, a first balance of account K2.1 for purse 2 or respectively K3.1 for purse 3 and K4.1 for purse 4 is stored in one balance-of-account memory 2.11 of the purse 2 or respectively 3.11 of the purse 3 or 4.11 of the purse 4. By way of example, a second balance of account K2.2 for purse 2 or respectively K3.2 for purse 3 or K4.2 for purse 4 is stored in the other balance-of-account memory 2.21 of the purse 2 or respectively 3.21 of the purse 3 or 4.21 of the purse 4.

The balance-of-account memories 2.11, 2.21, 3.11, 3.21, 4.11, 4.21 can each have, for example, three memory elements in each of which a two-digit numerical value is stored. The memory elements of the respective balance-of-account memory 2.11, 2.21, 3.11, 3.21, 4.11, 4.21 together comprise a four-digit transfer value with two places after the decimal point, as is evident from FIG. 2. Other memory configurations will become apparent to those of skill in the art given the present description.

Figure 2:
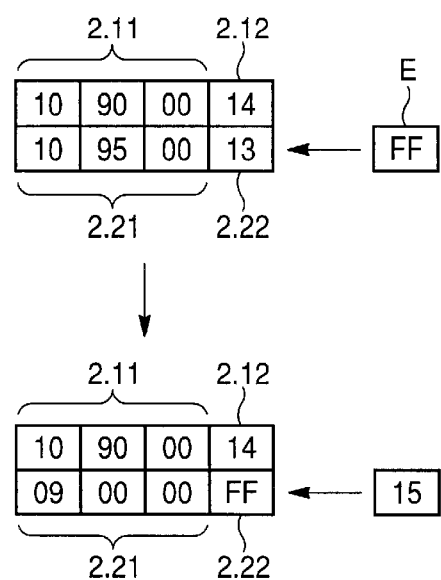
FIG. 2 shows an illustration of the content of two balance-of-account memories of the smart card in chronological succession during the operation of writing in a transfer value according to an embodiment of the present invention.

FIG. 2 diagrammatically illustrates the memory contents of the balance-of-account memories 2.11 and 2.21 of the purse 2. Each balance-of-account memory 2.11 and 2.21 is assigned a balance-of-account counter 2.12 and 2.22 respectively in which is stored the current counter reading of the entry in the purse 2. By way of example, a value of 1095.00 is stored in the balance-of-account memory 2.21, which value represents the thirteenth entry in the purse 2, as is indicated by the balance-of-account counter 2.22. The current balance of account of the purse 2 is stored in the balance-of-account memory 2.11, amounts to 1090.00 and represents the fourteenth entry in the purse 2, as is defined by the balance-of-account counter 2.12.

If a new transfer value is to be stored in the purse 2 by data transfer in the course of a payment operation, the corresponding transfer value is written to the balance-of-account memory 2.21 with the lower counter reading of the balance-of-account counter 2.22. Beforehand, however, the balance-of-account counter 2.22 is converted into a control memory, to the memory of which a write-in control value E of the magnitude FF (hexadecimal value) is written. This write-in control value E identifies the writing identification state of the control memory 2.22, it being possible for a transfer value to be written to the balance-of-account memory 2.21.

The control memory is preferably designed as a memory cell in the smart card, the write-in control value being kept constant during the transfer. The control memory is thus in an unambiguous invariable writing identification state during the transfer. This state can be converted into a variable writing confirmation state only after the proper transfer has been ascertained. The confirmation signal for the changeover of the state of the control memory from the writing identification state to the writing confirmation state may be a signal from the I/O interface which signals the end of the transfer.

Referring back to FIG. 2, the transfer value 900.00 is subsequently written to the balance-of-account memory 2.21, which represents the new balance of account of the purse 2. The control memory 2.22 remains unchanged until it is converted to a writing confirmation state, which is accompanied by the change in the content of the control memory 2.22. The latter acquires a confirmation value "15", which simultaneously serves as a counter reading for the number of balances of account or entries performed in the purse 2. Consequently, after a write access has been successfully made to the balance-of-account memory 2.21, the control memory 2.22 serves as balance-of-account counter again.

If the writing of the transfer value to the balance-of-account memory 2.21 proceeded incompletely, the control memory 2.22 would continue to remain in the writing identification state and indicate with the memory content "FF" that the transfer value written to the associated balance-of-account memory 2.21 is incomplete or incorrect. Afterward, the content of the other balance-of-account memory 2.11 would then be written to the balance-of-account memory 2.21 and a fault message would be generated with the request that the data transfer be restarted, that is to say that the writing of the transfer value be repeated.

The invention further provides processing and storage of transfer values in connection with a payment operation that is straightforward and manages with a small memory reserve. The device according to an embodiment of the invention can be used advantageously in particular when there are a plurality of different purses in a smart card 1.

The writing operation described above can likewise be applied to the other purses 3 and 4, which have the same structure and addressing with respect to the microprocessor 9.

According to an embodiment of the invention, the control memory is connected to a counter in such a way that it indicates the consecutive numbering of the balance of account stored in the balance-of-account memory in the writing confirmation state. Consequently, given a plurality of balance-of-account memories, the balance-of-account memory with the current balance of account can be identified at any time using the sequence number stored in the control memory.

According to another embodiment of the invention, precisely two balance-of-account memories are provided for a purse account, the current balance of account being stored in one balance-of-account memory and the old balance of account being stored in the other balance-of-account memory. In the event of renewed writing of a transfer value to the purse memory of the smart card, the transfer value is written to the balance-of-account memory having the old balance of account. After a successful transfer, the control memory assigned thereto acquired a higher sequence number, with the result that this control memory can now be identified as the control memory with the current balance of account.

As an alternative, each purse 2, 3, 4 may also be assigned a single balance-of-account memory 2.11, 3.11, 4.11 for storing the balance of account. In addition, a single balance-of-account memory is provided which receives and stores the current transfer value. This additional balance-of-account memory is assigned to the purses 2, 3, 4 according to the selection principle, that is to say in dependence on the selection of a purse 2, 3, 4 during the transaction operation. If, by way of example, a transaction value for the purse 2 is written to this additional balance-of-account memory and if the transaction is identified as being successful, then the value stored in this additional balance-of-account memory is valid as the new balance of account of the purse 2. Consequently, the additional balance-of-account memory becomes the balance-of-account memory for the purse 2 and the previous balance-of-account memory 2.11 of the purse 2 now serves as a transaction or buffer memory for the next transaction of the purse 2 or of the other purses 3 and 4. With each further successful entry, the functionality of the current transaction or buffer memory on the one hand, and of the balance-of-account memory assigned to the respective activated purse 2, 3, 4 on the other hand, changes over. This reciprocal changeover of the function of the two memories is dependent on the selection of the purse 2, 3 or 4.

The memory requirement can be reduced further as a result of this measure, since a plurality of transactions do not usually have to be carried out simultaneously.

In summary, an advantage of the invention consists, in particular, in the fact that a control memory is provided in which, during the transfer of a current balance of account from the terminal to the smart card, a write-in control value is generated which is assigned to the balance-of-account memory of the smart card to which the current balance of account is to be written. The content of the control memory is dependent on the beginning and end of the transfer operation. The control memory preferably has a write-in control value during the transfer operation, the write-in control value can be erased as soon as the current balance of account has been completely written to the relevant balance-of-account memory. It is thus possible to identify proper transmission and storage of the transfer value representing the new balance of account.

Although the invention has been described above by reference to certain embodiments of the invention, the invention is not limited the embodiments described above. Modifications and variations of the embodiments described above will occur to those skilled in the art, in light of the above teachings. The scope of the invention is defined with reference to the following claims.

German Patent Application No. 198 58 840.2, filed on Dec. 19, 1998, including the specification, the drawings, the claims, and the abstract, upon which this application is based, is incorporated herein by reference in its entirety.

What is claimed is:

1. A method for bidirectional data transfer between a terminal and a smart card with a purse function, comprising:
   writing a transfer value from the terminal to a balance-of-account memory of the smart card;
   writing a write-in control value (E) to a control memory of the smart card together with the writing of the transfer value to the balance-of-account memory; and
   erasing the write-in control value (E) as soon as the transfer value is completely stored in the balance-of-account memory.

2. The method according to claim 1, wherein firstly the write-in control value (E) is written to the control memory, then the transfer value is written to the balance-of-account memory, and then the write-in control value (E) in the control memory is erased, provided that no fault message was manifested in the smart card at as end of the write access.

3. The method according to claim 1, wherein the transfer value is finally stored in the balance-of-account memory only when the write-in control value (E) has been erased.

4. A smart card for bidirectional data transfer between a terminal and a smart card with a purse function, comprising:

at least one balance-of-account memory for storing a transfer value transmitted by the terminal; and a control memory for storing a write-in control value (E), wherein said at least one balance-of-account memory is assigned said control memory for storing a write-in control value (E), alterable depending on a presence of a fault, and wherein said transfer value stored in said balance-of-account memory is finally stored only if the control memory has assumed a writing confirmation state.

5. The smart card as claimed in claim 4, wherein said control memory is integrated in a memory of the smart card.

6. The smart card as claimed in claim 4, wherein said control memory has at least two states, said control memory having the write-in control value (E) in a writing identification state and having a confirmation value in a writing confirmation state.

7. The smart card as claimed in claim 6, wherein said confirmation value is designed to be a value which specifies a number of transfer values written to said balance-of-account memories of the purses.

8. The smart card as claimed in claim 5, wherein said memory of the smart card is subdividable into at least two balance-of-account memories respectively assigned to a purse.

9. The smart card as claimed in claim 8, comprising a plurality of purses, wherein said purses are each assigned two balance-of-account memories, wherein a current, first balance of a first account is stored in a first balance-of-account memory, and a preceding, second balance of a second account is stored in a second balance-of-account memory, and wherein said transfer value is stored in said balance-of-account memory having said second balance of said second account.

10. The smart card as claimed in claim 5, wherein said control memory comprises a sequence counter which changes over to a writing identification state for a writing of said transfer value to said balance-of-account memory.

11. The smart card as claimed in claim 5, wherein said balance-of-account memory and said control memory each comprise non-volatile memories.

12. The smart card as claimed in claim 4, comprising a plurality of balance-of-account memories and a plurality of purses, wherein a number of balance-of-account memories corresponds to a number of purses increased by a value of one, and wherein each balance-of-account memory is assigned respectively to each purse.

* * * * *